Patented Aug. 7, 1928.

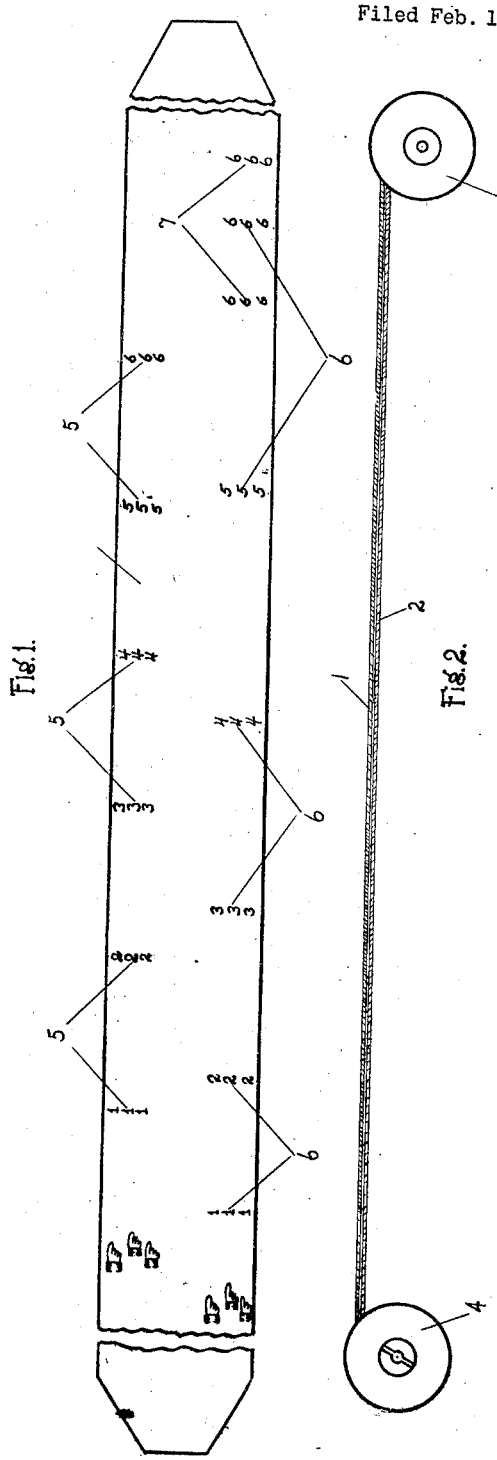

1,679,956

UNITED STATES PATENT OFFICE.

CARL A. BORNMANN, OF BINGHAMTON, NEW YORK, ASSIGNOR, BY MESNE ASSIGNMENTS, TO AGFA ANSCO CORPORATION, OF BINGHAMTON, NEW YORK, A CORPORATION OF NEW YORK.

PHOTOGRAPHIC-FILM CARTRIDGE.

Application filed February 16, 1926. Serial No. 88,593.

My invention relates to photographic film cartridges and has for its primary object to provide an arrangement of indicating numerals or indices on the paper backing or protective covering of the film.

Another object provides for two sets of indicating characters on such cartridge whereby the film may be used in an automatic film winding camera, wherein an irregular spacing of the film occurs, or in the regular hand winding camera, wherein the usual uniform arrangement only of characters is required.

Referring now more particularly to the drawing wherein like reference numerals indicate like parts, Figure 1 illustrates a miniature strip of the protective film cover, with the reference characters arranged thereon.

Figure 2 is a side view of a film cartridge opened and illustrating how the film, together with its protective covering, is wound from one spool onto another.

It will be understood that in ordinary cameras of the hand winding type, there is provided in the back a peep hole or window past which a series of indicating characters are wound as the film is turned from one spool to the other. These indicating characters are evenly spaced and mark the distance which the operator must turn the film in order to advance a fresh length of film in the position in the camera for an exposure.

It will be also understood that in automatic film winding cameras, the film is wound from one spool to another by a power driven mechanism. Unless some special, expensive and complicated mechanism is provided in the camera to properly regulate the winding mechanism as the winding mechanism is operated each time to move the film, said mechanism will be stopped after the same amount of rotation each time. Obviously, if the winding mechanism rotates the same distance each time it is operated, varying lengths of film will be wound from one spool to another due to the varying diameter of the winding spool. The indicating characters therefore on the protective paper covering of the film for use in hand wound cameras will vary in their position at each operation of the automatic mechanism with relation to the peep hole or window in the back of the camera. The operator will then be unable to ascertain how many exposures have been made.

To overcome this difficulty, the automatic film winding cameras have been provided with an additional window or peep hole through which the especially arranged set of indicating characters of my improved film cartridge will be visible.

The reference numeral 1 indicates the strip of protective covering of paper or other suitable material which is wound together with the sensitized film strip 2, from the spool 3 onto the spool 4. Along one edge of the protective strip 1 are provided the uniformly spaced series of indicating characters 5 usually numbering from one to six or more. These characters are used as the exposure indicating means when the film is wound through a hand operated camera, or when the automatic camera in which this film is used is turned by hand.

On the opposite edge of the strip 1 is printed a second series of indicating characters 6, which beginning with the numeral one, are progressively spaced further apart as the numbers run from one to six. This uneven spacing of this set of indicating characters compensates for the varying diameter of the take-up spool 4 as the film is wound thereon. These indicating characters are therefore visible through the additional peep hole or window provided, as before mentioned, in the automatic film winding type of cameras. It may be noted here that as a rule this special peep hole or window for this set of characters is usually somewhat elongated in order to take care of whatever variations there may be in the thickness of the paper covering 1, or the film 2, or in the diameter of the film spool, causing a secondary displacement of the indicating characters 6. As such displacement is usually greatest at the back end of the strip, I have also provided a supplementary set of indicators 7 on either side of the last exposure indicator.

From the foregoing, it will be understood that I have provided a film cartridge adapted for use either in the usual hand winding camera or in an automatic film winding camera, or for winding by hand or automatically in such automatic winding camera.

I have not deemed it necessary to illustrate the camera back which cooperates with the film strip shown inasmuch as the same is of the usual design and is well known in the art.

I am aware that various changes in details of arrangement may be made without departing from the scope of my invention. I do not limit myself therefore to the exact form shown other than by the appended claim.

I claim:—

A photographic film cartridge including a strip of sensitized film, and an overlying strip of protective material having a set of uniformly spaced exposure indicating characters therein, a second set of exposure indicating characters on said strip, the spaces between said characters of said second set progressively increasing from one end.

CARL A. BORNMANN.